(12) United States Patent
Li

(10) Patent No.: US 10,884,512 B2
(45) Date of Patent: Jan. 5, 2021

(54) KEY DEVICE AND KEYBOARD DEVICE

(71) Applicant: Chicony Electronics Co., Ltd., New Taipei (TW)

(72) Inventor: Po-Hsin Li, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 16/403,825

(22) Filed: May 6, 2019

(65) Prior Publication Data

US 2020/0174579 A1 Jun. 4, 2020

(30) Foreign Application Priority Data

Dec. 4, 2018 (TW) .............................. 107143530 A

(51) Int. Cl.
| | | |
|---|---|---|
| *H01H 13/705* | (2006.01) | |
| *G06F 3/02* | (2006.01) | |
| *H01H 13/7065* | (2006.01) | |
| *G06F 1/16* | (2006.01) | |

(52) U.S. Cl.
CPC .......... *G06F 3/0224* (2013.01); *G06F 1/1671* (2013.01); *H01H 13/705* (2013.01); *H01H 13/7065* (2013.01)

(58) Field of Classification Search
CPC ................. H01H 13/705; H01H 13/12; H01H 2221/044; H01H 2215/008; H01H 2233/004; H01H 13/14; H01H 13/50; H01H 13/807; H01H 13/83; H01H 15/16; H01H 13/52; H01H 3/125; H01H 13/7065; H01H 13/20; H01H 13/48; H01H 3/12
See application file for complete search history.

(56) References Cited

U.S. PATENT DOCUMENTS

| | | | | | |
|---|---|---|---|---|---|
| 4,582,967 | A | * | 4/1986 | Brumit | H01H 13/705 200/343 |
| 4,967,467 | A | * | 11/1990 | Udagawa | H01H 21/22 200/343 |
| 5,788,060 | A | * | 8/1998 | Kuroda | H01H 21/22 200/343 |
| 5,912,443 | A | * | 6/1999 | Hasunuma | H01H 13/705 200/5 A |

(Continued)

FOREIGN PATENT DOCUMENTS

| | | |
|---|---|---|
| CN | 201294180 Y | 8/2009 |
| CN | 201984996 U | 9/2011 |
| CN | 202258933 U | 5/2012 |

*Primary Examiner* — Ahmed M Saeed
(74) *Attorney, Agent, or Firm* — Muncy, Geissler, Olds & Lowe, P.C.

(57) ABSTRACT

A key device includes a substrate, a key cap and a restoring member. The substrate includes a top surface and two pivot seats protruding on the top surface. The pivot seats are spaced from each other. Each pivot seat has an eave portion laterally extending from a top thereof. The eave portion has a bottom edge. The key cap is above the top surface. The key cap includes a side edge and two extending arms extending from the side edge. An end of each extending arm has a pivoting portion. The pivoting portions pivotally abut against the bottom edges of the eave portions respectively without contacting the top surface of the substrate. The restoring member is between the substrate and the key cap and abuts against a bottom of the key cap.

18 Claims, 8 Drawing Sheets

(56) References Cited

U.S. PATENT DOCUMENTS

| | | | |
|---|---|---|---|
| 6,940,030 B2 * | 9/2005 | Takeda | H01H 13/705 200/343 |
| 7,381,919 B1 * | 6/2008 | Yu | H01H 21/24 200/296 |

* cited by examiner

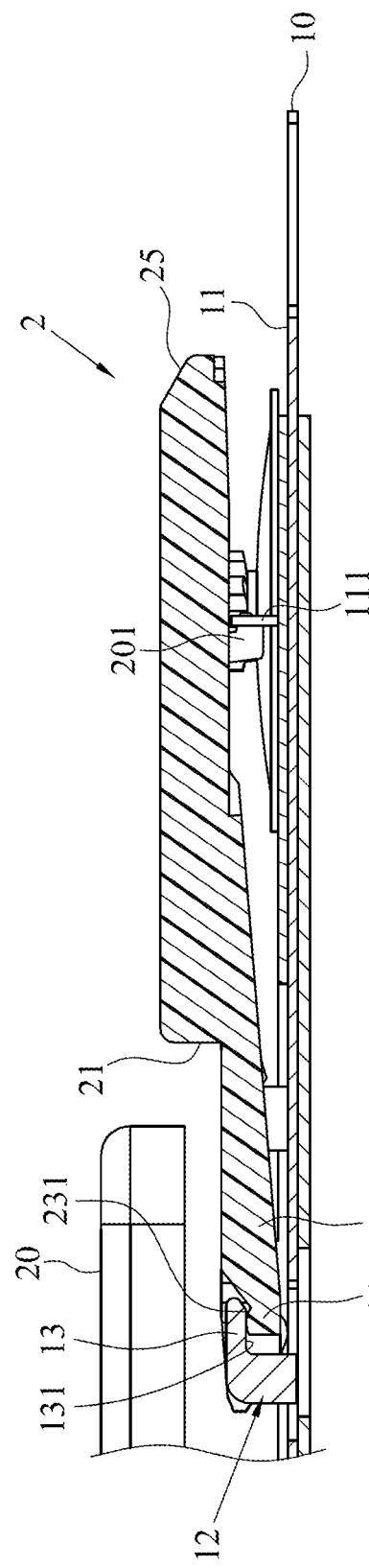
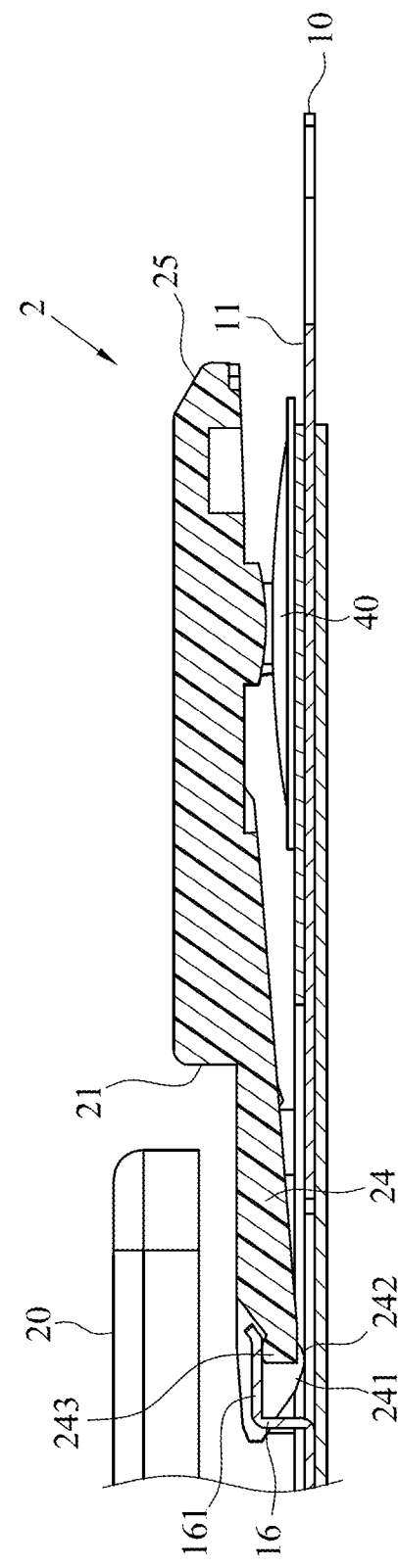

US 10,884,512 B2

KEY DEVICE AND KEYBOARD DEVICE

CROSS-REFERENCE TO RELATED APPLICATION

This non-provisional application claims priority under 35 U.S.C. § 119(a) to Patent Application No. 107143530 filed in Taiwan, R.O.C. on Dec. 4, 2018, the entire contents of which are hereby incorporated by reference.

BACKGROUND

Technical Field

The instant disclosure relates to an input device and, more particularly, to a key device and a keyboard device.

Related Art

Keys are one kind of commonly used input devices. For example, a keyboard or a touch pad of a laptop computer generally includes keys. Users can press the keys to generate corresponding signals.

There are many types of keys. Regarding the key of tilting type, its structure generally includes a key cap and a base plate. The key cap has a pivoting side and is pivotally connected to the base plate by the pivoting side. While a portion of the key cap away from the pivoting side is pressed, the key cap may tilt about the pivoting side to move down relative to the base plate and to generate a corresponding signal.

Nonetheless, during the using of the keys operated by a user, it is less likely that the user precisely presses every key by the portion of the key cap away from the pivoting side. In a case that the use presses a key by the pivoting side or a region (or a corner) close to the pivoting side of the key cap, the key cap may not tilt down successfully to generate a corresponding signal, which may cause trouble in operating the keys and negatively impact the feel of the use.

SUMMARY

To address the above issue, a key device is provided in an embodiment. The key device comprises a substrate, a key cap, and a restoring member. The substrate comprises a top surface and two pivot seats protruding on the top surface. The pivot seats are spaced from each other. Each of the pivot seats has an eave portion laterally extending from a top thereof. The eave portions each comprise a bottom edge. The key cap is disposed above the top surface. The key cap comprises a side edge and two extending arms extending from the side edge. An end of each of the extending arms has a pivoting portion. The pivoting portions pivotally abut against the bottom edges of the eave portions respectively without contacting the top surface. The restoring member is disposed between the substrate and the key cap. The restoring member abuts against a bottom of the key cap.

In an embodiment, a keyboard device is provided, which comprises a plurality of said key devices.

Thereby, according to the key device of embodiments of the instant disclosure, the two extending arms extend from the side edge of the key cap to be respectively and pivotally disposed on the pivot seats of the substrate; therefore, in the process of operating the key device, while any portion of the key cap (e.g., any corner or any edge of the key cap) is pressed, the key cap can tilt down successfully to generate a corresponding signal.

BRIEF DESCRIPTION OF THE DRAWINGS

FIG. 5 illustrates a cross sectional view of section 5-5 of FIG. 4;

FIG. 6 illustrates a cross sectional view of section 6-6 of FIG. 4;

DETAILED DESCRIPTION

Figure 1:
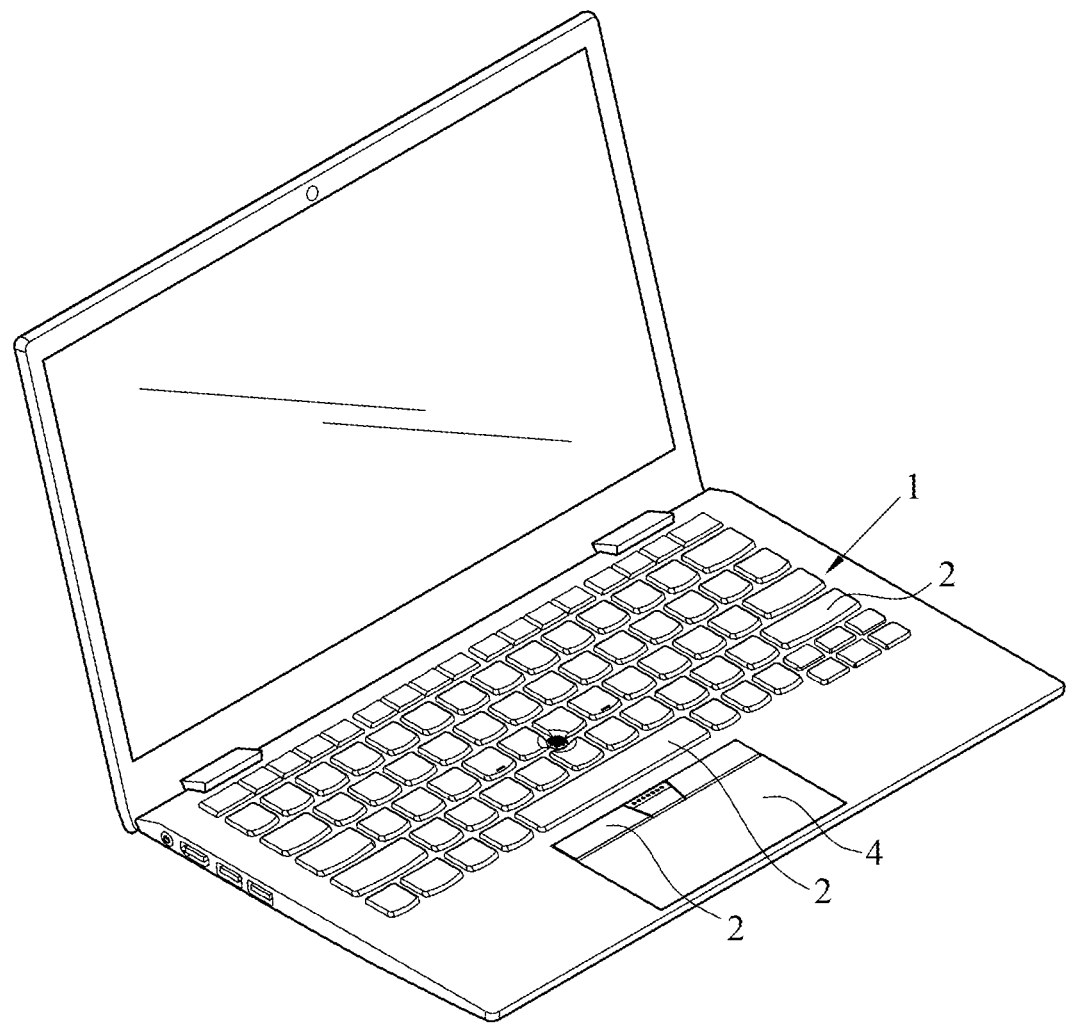
FIG. 1 illustrates a perspective view of a keyboard device according to an embodiment of the instant disclosure.
Figure 2:
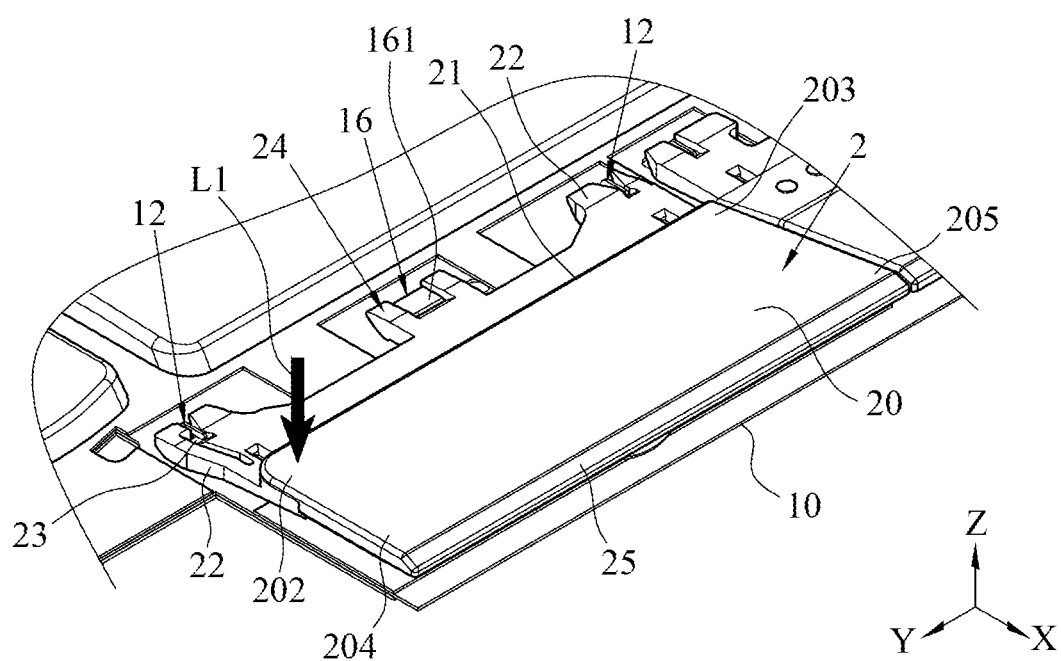
FIG. 2 illustrates a perspective view of a key device according to an embodiment of the instant disclosure.
Figure 3:
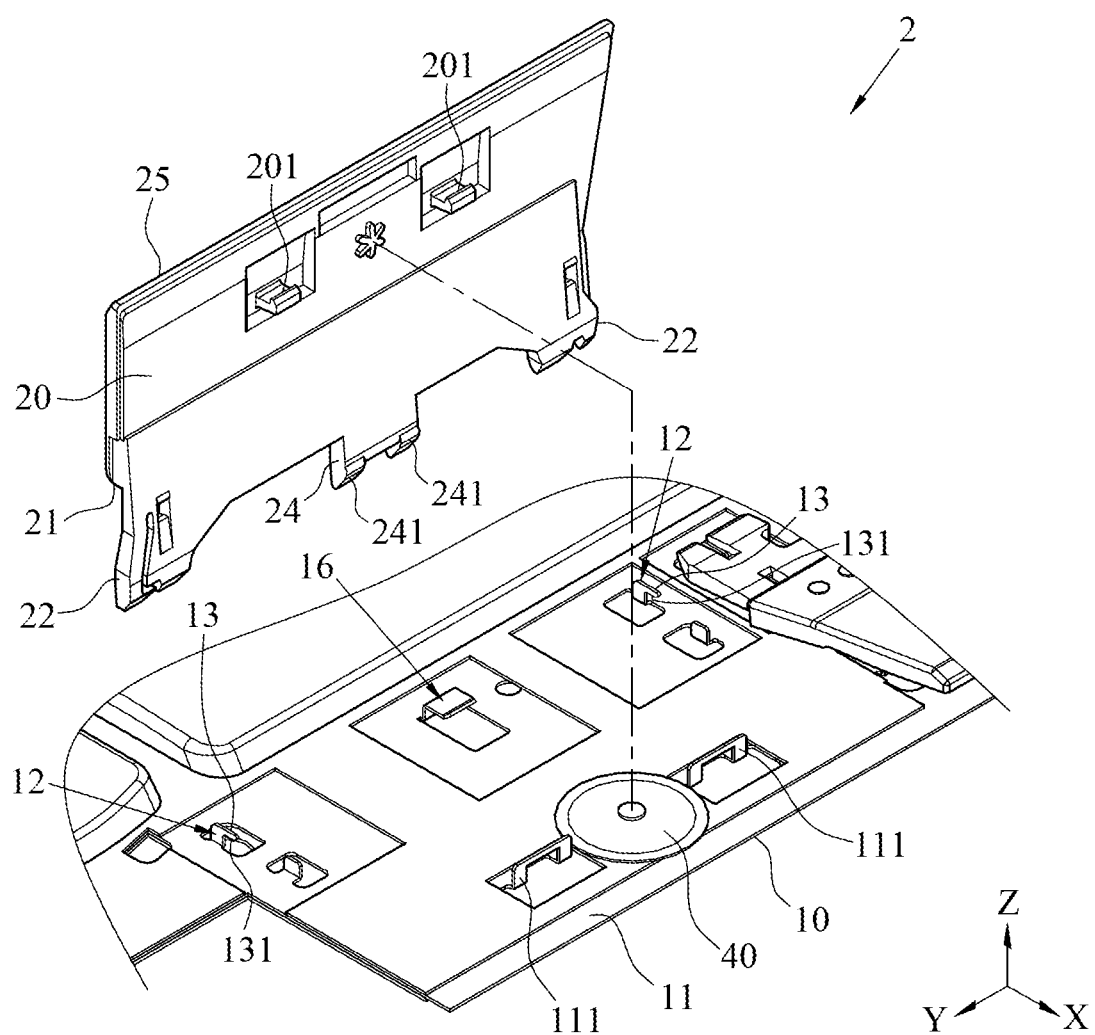
FIG. 3 illustrates an exploded view of the key device according to an embodiment of the instant disclosure.

As shown in FIG. 1 to FIG. 3, a key device 2 of an embodiment of the instant disclosure comprises a substrate 10, a key cap 20, and a restoring member 40. The key device 2 may be applied to varied kinds of electronic products (e.g., desktop computers, laptop computers, or any input devices of other electronic devices) to allow a user to press to generate corresponding signals. As shown in FIG. 1, in a case of a laptop computer, a keyboard device 1 of the laptop computer may comprise several key devices 2. In other words, the key devices 2 may be letter keys, number keys, or the space key of the keyboard device 1 to allow a user to press to input words, symbols, or commands. Alternatively, the key devices 2 may be keys of a touch pad 4 of the laptop computer to allow a user to press to execute actions such as selecting or opening a function menu.

As shown in FIG. 2 and FIG. 3, the substrate 10 of the key device 2 comprises a top surface 11 and two pivot seats 12 protruding on the top surface 11 for being pivotally connected with the key cap 20. The two pivot seats 12 are spaced from each other. In the embodiment, the two pivot seats 12 are arranged along Y axis shown in the figures in spaced relation and are at the same axis. Alternatively, the two pivot seats 12 may be at different axes. In addition, each of the pivot seats 12 has an eave portion 13 laterally extending from a top thereof (The eave portion 13 extends along X axis from the top the pivot seat 12 in the embodiment). The eave portion 13 comprises a bottom edge 131. In some embodiments, the substrate 10 may be a hard plate made by metal (e.g., iron, aluminum, or alloy) or plastic materials. Each pivot seat 12 may be a hook (the hook is of L shape in the embodiment; alternatively, the hook may be of another shape such as U shape or T shape), which is one-piece formed with the substrate 10 and is bent and extends upwardly from the substrate 10. The invention is not limited to the embodiments. In other embodiments, each pivot seat 12 may be fixed to the substrate 10 in an assembling manner.

As shown in FIG. 2 and FIG. 3, the key cap 20 is disposed above the top surface 11 of the substrate 10. The key cap 20 comprises a side edge 21 proximal to the two pivot seats 12 and two extending arms 22 extending from the side edge 21. In the embodiment, the two extending arms 22 are respectively at two opposite ends of the side edge 21 and extend along X axis. Each of the extending arms 22 has a pivoting portion 23. The pivoting portions 23 of the two extending arms 22 pivotally abut against the bottom edges 131 of the eave portions 13 of the two pivot seats 12 respectively. However, the two pivoting portions 23 do not contact the top surface 11 of the substrate 10 and keep an interval from the substrate 10. As a result, the key cap 20 can tilt about the two pivoting portions 23 relative to the substrate 10. In the embodiment, the two pivoting portions 23 are, but are not limited to, at the same axis to correspond to the two pivot seats 12. The two pivoting portions 23 may also be at different axes. For example, one of the pivoting portions 23 may be closer to a side of the side edge 21 of the key cap 20 relative to the other one of the pivoting portions 23.

Figure 4:
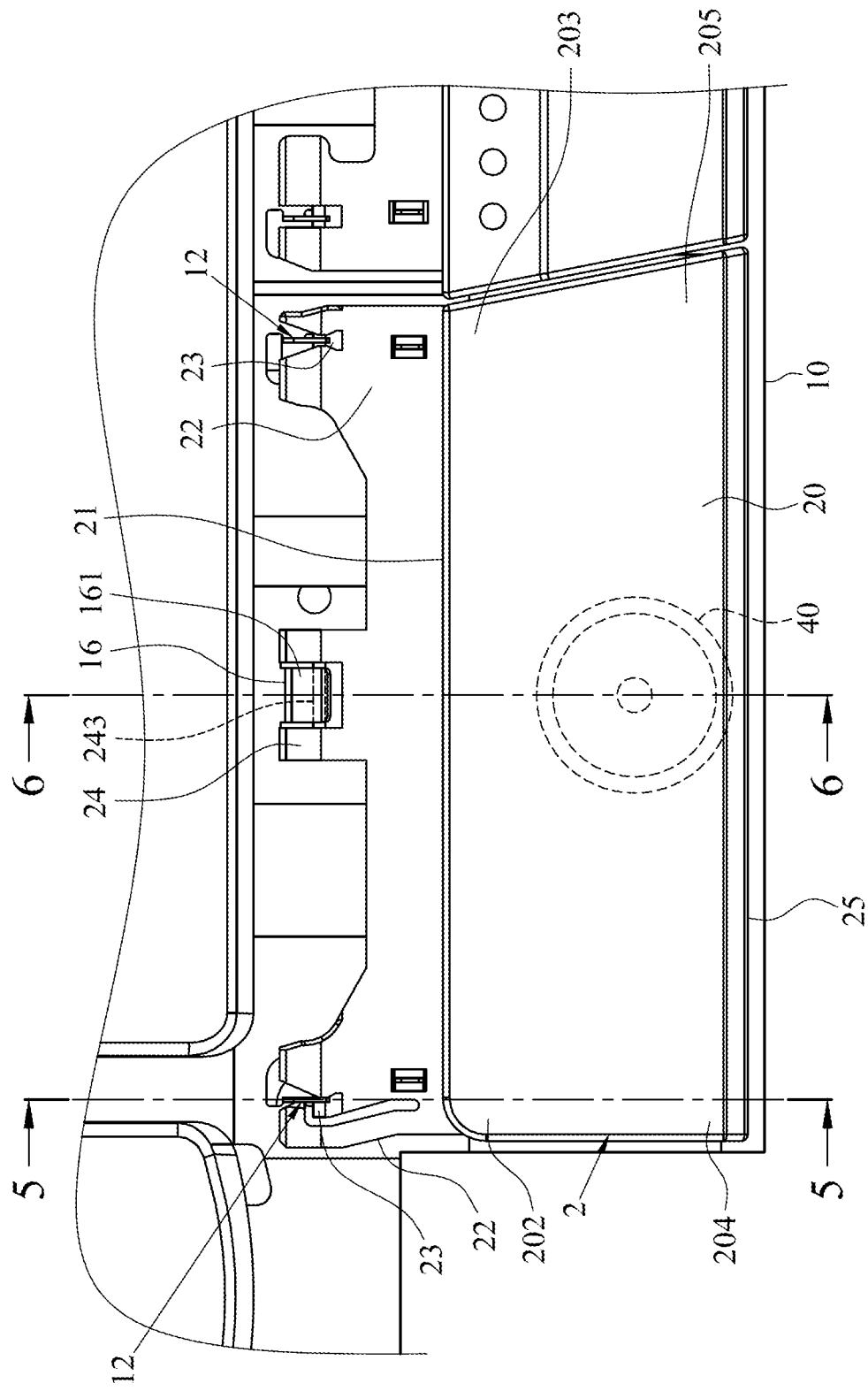
FIG. 4 illustrates a top view of the key device according to an embodiment of the instant disclosure.

As shown in FIG. 4 and FIG. 5, in an embodiment, each of the pivoting portions 23 of the key cap 20 may comprise an arc top surface 231. The arc top surfaces 231 of the pivoting portions 23 respectively abut against the bottom edges 131 of the eave portions 13 of the pivot seats 12, such that while the key cap 20 tilts about the pivoting portion 23 relative to the substrate 10, the arc top surface 231 can reduce the interference between the pivoting portion 23 and the pivot seat 12 to make the process of the key cap 20 tilting up and down smoother.

In addition, as shown in FIG. 2 and FIG. 3, in the embodiment, the key cap 20 further comprises a support member 24 extending from the side edge 21. Wherein, the support member 24 is a plate extending from the side edge 21 along X axis and the support member 24 is disposed between the two extending arms 22. Preferably, the support member 24 is, but is not limited to, in the middle of the two extending arms 22. A bottom of the support member 24 comprises at least one convex portion 241 (there are two convex portions 241 arranged along Y axis in spaced relation in the embodiment). Each of the convex portions 241 abuts against the top surface 11 of the substrate 10 to support the key cap 20. As shown in FIG. 4 and FIG. 6, each of the convex portions 241 of the support member 24 comprises an arc bottom surface 242. The arc bottom surface 242 abuts against the top surface 11 of the substrate 10. Based upon the arc bottom surface 242, while the key cap 20 tilts about the pivoting portion 23 relative to the substrate 10, the interference between the convex portion 241 and the substrate 10 can be reduced to make the process of the key cap 20 tilting up and down smoother.

In some embodiments, as shown in FIG. 5 and FIG. 6, an interference amount or a contact area between the convex portion 241 of the support member 24 and the top surface 11 of the substrate 10 may be greater than an interference amount or a contact area between each of the pivot seats 12 and the corresponding pivoting portion 23 of the key cap 20. For instance, the interference amount between the convex portion 241 of the support member 24 and the top surface 11 of the substrate 10 is 0.05 mm, and the interference amount between each of the pivot seats 12 and the corresponding pivoting portion 23 of the key cap 20 is 0.02 mm. In such case, the key cap 20 may encounter with a slight resistance in the tilting process so as to avoid the key cap 20 tilting with excessive force to hit components on the substrate 10, which may result in damage or noise.

As shown in FIG. 2, FIG. 3, FIG. 4, and FIG. 6, the substrate 10 further comprises a pivot hook 16 protruding on the top surface 11 of the substrate 10 and between the two pivot seats 12 to correspond to the support member 24. In the embodiment, the pivot hook 16 is one-piece formed with the substrate 10 and the pivot hook 16 is bent and extends upwardly from the substrate 10. The pivot hook 16 has a blocking plate 161 laterally extending from a top thereof (The blocking plate 161 extends along X axis from the top of the pivot hook 16 in the embodiment). The support member 24 comprises an assembling portion 243. The assembling portion 243 pivotally abuts against the blocking plate 161 of the pivot hook 16 without contacting the top surface 11 of the substrate 10 and keeps an interval from the substrate 10, such that an upper surface and a lower surface of the support member 24 may respectively be against and restricted by the substrate 10 and the pivot hook 16, so as to meet a better support effect and have the tilting process of the key cap 20 more stable.

As shown in FIG. 3, FIG. 5, and FIG. 6, the restoring member 40 is disposed between the substrate 10 and the key cap 20. Wherein, the restoring member 40 generates restoring force to make the key cap 20 tilt back relative to the substrate 10. In the embodiment, the restoring member 40 is a metal dome, which abuts against the bottom of the key cap 20, such that the key cap 20 stays at a position with certain height, and the two two pivoting portions 23 may continuously and upwardly abut against the two eave portions 13 of the two pivot seats 12. In addition, in the embodiment, the two extending arms 22 extend from two opposite ends of the side edge 21. The restoring member 40 is proximal to the middle of the side edge 21 relative to the two extending arms 22 and is between the two extending arms 22. While the key cap 20 is pressed, the key cap 20 may tilt about an axis, which may be deemed as a virtual line connected by the two pivoting portions 23, to be proximal to the substrate 10 and abut against the restoring member 40 to store the restoring force. Wherein, there is a circuit board, e.g., a general printed circuit board (PCB), a flexible printed circuit board (FPCB), or a Rigid-Flex PCB, disposed on the substrate 10. While the restoring member 40 is pressed, the circuit board may be triggered to generate a corresponding signal. While the key cap 20 is released, the key cap 20 may tilt upwardly by the restoring force stored by the restoring member 40 to return to a neutral position of a non-pressed state. In some embodiments, the restoring member 40 may be, but not limited to, a rubber dome, a metal elastic piece, a spring, or a mechanic switch.

Thereby, according to the key device 2 of the embodiments of the instant disclosure, the two extending arms 22 extend from the side edge 21 of the key cap 20 to be respectively and pivotally disposed on the pivot seats 12 of the substrate 10; therefore, regarding the process of operating the key device 2, while any portion (e.g., any corner or any edge) of the key cap 20 is pressed, the key cap 20 can tilt down successfully to generate a corresponding signal. It is illustrated in the various figures as follows.

Figure 7:
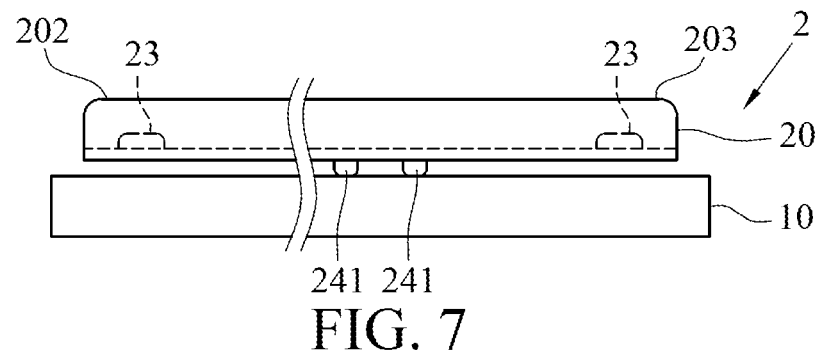
FIG. 7 illustrates a schematic view of the key device not pressed according to an embodiment of the instant disclosure.
Figure 8:
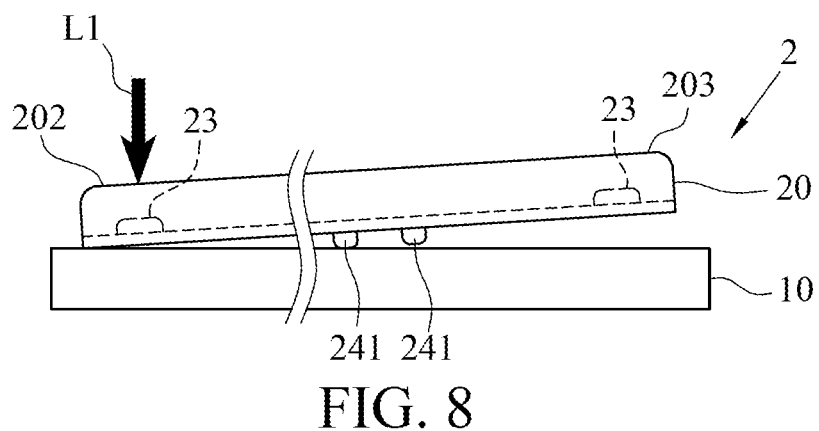
FIG. 8 illustrates a schematic view of the key device being pressed according to an embodiment of the instant disclosure.
Figure 9:
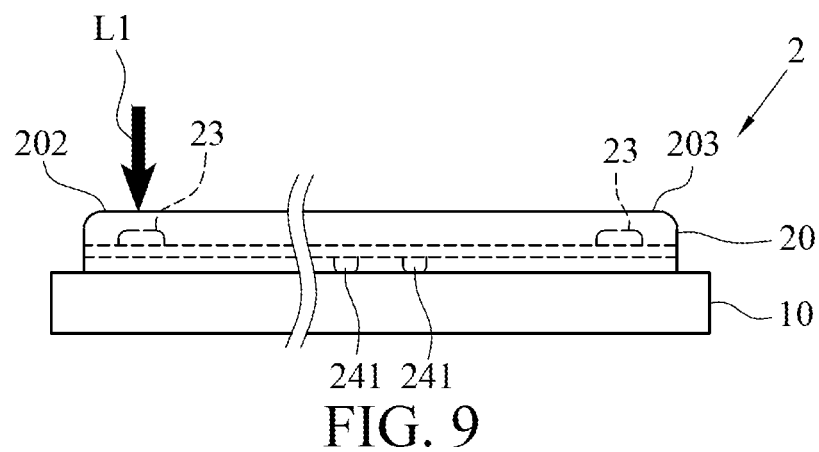
FIG. 9 illustrates a schematic view of the key device being pressed according to an embodiment of the instant disclosure.

As shown in FIG. 4 to FIG. 7, since the key cap 20 is pivotally disposed on the pivot seats 12 of the substrate 10 by the extending arms 22, the entire key cap 20 is against by the restoring member 40 to keep an interval from the substrate 10 (please refer to FIG. 5 and FIG. 7). Thereby, even if the side edge 21 or a corner of the key cap 20 proximal to the pivot seat 12 is pressed, the key cap 20 can still tilt down successfully. Please refer to FIG. 2, FIG. 7, and FIG. 8, in the embodiment, while a corner 202 of the key cap 20 proximal to the side edge 21 is pressed (as indicated by an arrow L1 shown in FIG. 2 and FIG. 8), a middle region of the key cap 20 is supported by the restoring member 40 and the two convex portions 241 of the support member 24, and each of the pivoting portions 23 keeps an interval from the substrate 10; therefore, the corner 202 of the key cap 20 may tilt down in advance (as shown in FIG. 8), such that another corner 203 of the key cap 20 proximal to the side edge 21 may tilt up. However, the pivoting portion 23 proximal to the corner 203 abuts against the pivot seat 12; therefore, the side of the key cap 20 proximal to the corner 203 may also be forced by reaction force to move down simultaneously (as shown in FIG. 9), such that the entire key cap 20 may tilt down successfully to press the restoring member 40, so as to generate a corresponding signal.

As shown in FIG. 3 and FIG. 5, the substrate 10 further comprises two first hook members 111 disposed on the top surface 11. In the embodiment, the two first hook members 111 are proximal to an opposite edge 25 of the key cap 20. Wherein, the opposite edge 25 and the side edge 21 are at two opposite sides of the key cap 20. In an embodiment, the two first hook members 111 may also be at another position of the substrate 10. In addition, the two first hook members 111 are spaced from each other (the two first hook members 111 are arranged along Y axis in spaced relation in the embodiment). The two first hook members 111 are hooks (the hook is of U shape in the embodiment; alternatively, the hook may be of L shape or another shape), which are one-piece formed with the substrate 10 and are bent and extend upwardly from the substrate 10. The key cap 20 further comprises two second hook members 201 disposed on the bottom of the key cap 20 and respectively hooked to the two first hook members 111. In the embodiment, the two second hook members 201 are reverse hooks one-piece formed with and protruded from the bottom of the key cap 20 to be respectively and correspondingly coupled with the two first hook members 111. Thereby, an issue of the key cap 20 easily tilting up to detach from the substrate 10 while not being pressed can be avoided. In some embodiments, the first hook member 111 may also be a reverse hook one-piece formed with and protruded from the top surface 11 of the substrate 10, and the second hook member 201 may be a hook one-piece formed with and protruded from the bottom of the key cap 20. The invention is not limited to the embodiments. In addition, the numbers of the first hook member 111 and the second hook member 201 may be adjusted according to the need of product in practice. For example, the numbers of the first hook member 111 and the second hook member 201 may be one, respectively.

As shown in FIG. 4, in an embodiment, the restoring member 40 disposed between the substrate 10 and the key cap 20 may be proximal to the opposite edge 25 of the key cap 20, such that a distance between the corner 202 or the corner 203 of the key cap 20 proximal to the side edge 21 and the restoring member 40 is greater than that between a corner 204 or a corner 205 of the key cap 20 proximal to the opposite edge 25 and the restoring member 40. Comparing to the above-mentioned embodiment in which the restoring member 40 is disposed in the middle of the key cap 20, the distance between the corner 202 or the corner 203 and the restoring member 40 of the embodiment shown in FIG. 4 is increased; therefore, an idle stroke of the corner 202 or the corner 203 occurring at the moment of the corner 202 or the corner 203 being pressed is increased (e.g., increased from 1 mm to 1.2 mm). In addition, comparing to the above-mentioned embodiment in which the restoring member 40 disposed in the middle of the key cap 20, the distance between the corner 204 or the corner 205 and the restoring member 40 of the embodiment shown in FIG. 4 is decreased; therefore, an idle stroke of the corner 204 or the corner 205 occurring at the moment of the corner 204 or the corner 205 being pressed is decreased (e.g., decreased from 1.7 mm to 1.5 mm). Thereby, the feel of pressing the corner 202 or the corner 203 of the key cap 20 is similar to the feel of pressing the corner 204 or the corner 205, such that it is more comfortable to operate the key cap 20.

Figure 10:
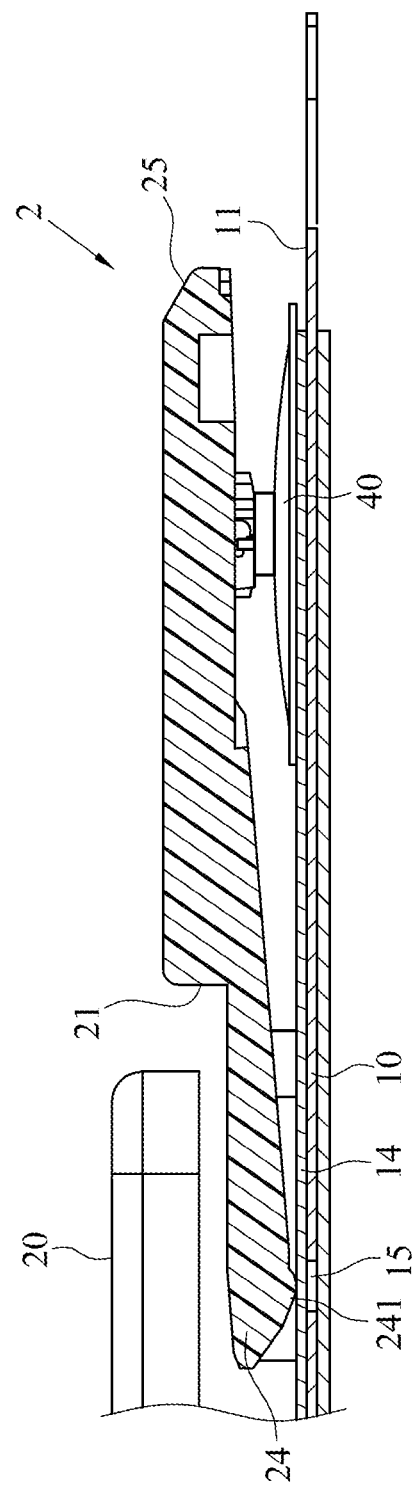
FIG. 10 illustrates a cross sectional view of the key device according to another embodiment of the instant disclosure.

In another embodiment, as shown in FIG. 10, the substrate 10 further comprises a thin film circuit board 14 disposed on the top surface 11. The thin film circuit board 14 is, for example, a flexible circuit board formed by superposed thin films. The convex portion 241 of the support member 24 extending from the key cap 20 is against the thin film circuit board 14. Since the thin film circuit board 14 has elasticity, while the corner 202 or the corner 203 of the key cap 20 proximal to the support member 24 is pressed (please refer to FIG. 4), the convex portion 241 of the support member 24 may downwardly compress the thin film circuit board 14 to have the thin film circuit board 14 slightly sink, such that a down stroke of the corner 202 or the corner 203 while being pressed can be increased. The feel of pressing the corner 202 or the corner 203 can be more similar to the feel of pressing the corner 204 or the corner 205 of the key cap 20. In some embodiments, the support member 24 may be an elastic support member. For example, the support member 24 may be an elastic tongue piece. While the corner 202 or the corner 203 of the key cap 20 proximal to the support member 24 is pressed, the support member 24 may be forced to slightly move up, and the corner 202 or the corner 203 of the key cap 20 may further sink.

As shown in FIG. 10, in an embodiment, the substrate 10 may has an opening 15 to correspond to the convex portion 241 of the support member 24, such that while the corner 202 or the corner 203 of the key cap 20 proximal to the support member 24 is pressed, the convex portion 241 of the support member 24 may further downwardly compress the thin film circuit board 14 and enter the opening 15, and a down stroke of the corner 202 or the corner 203 while being pressed can be increased.

Figure 11:
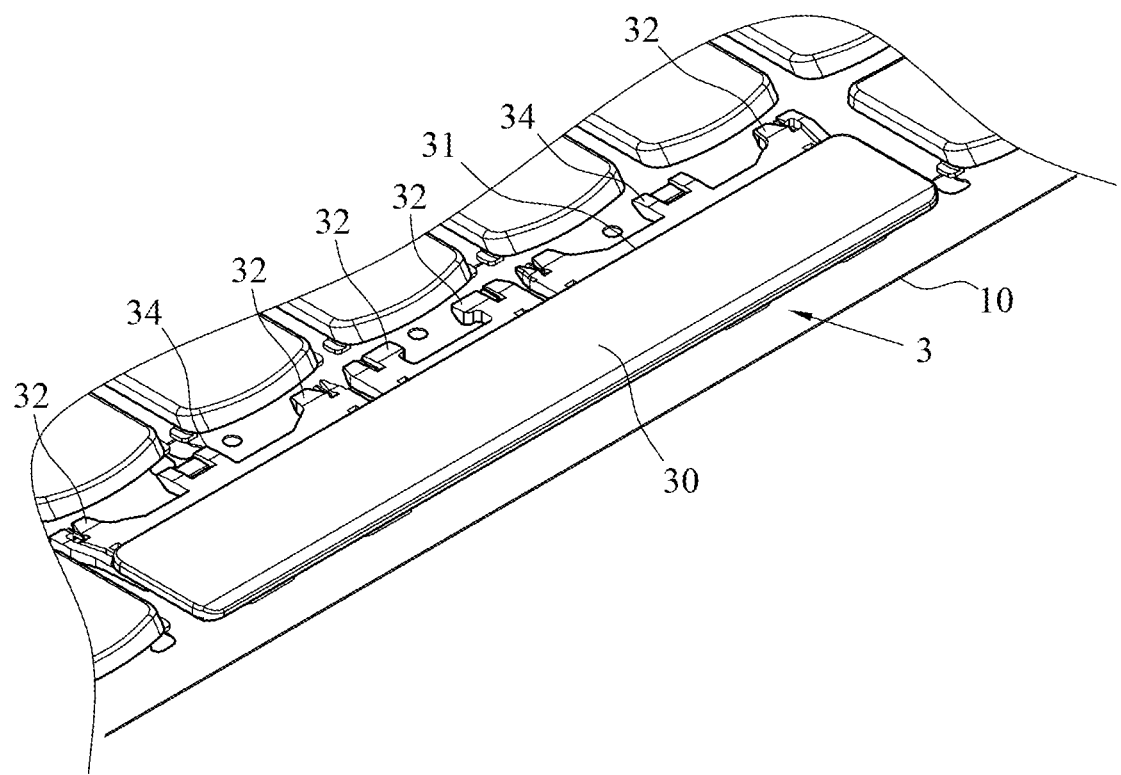
FIG. 11 illustrates a perspective view of the key device according to another embodiment of the instant disclosure.

As shown in FIG. 11, a key device 3 of the embodiment is applied to a computer keyboard. For example, the key device 3 may be a space key of the keyboard device 1. Regarding such kind of keys with greater aspect ratio, a key cap 30 of the key device 3 may comprises two or more extending arms 32 extending from a side edge 31 of the key cap 30 to be pivotally connected to the substrate 10. The key cap 30 may comprises support members 34 disposed between the extending arms 32 to be against the substrate 10, so as to enhance the strength of the structure of the key device 3. As a result, the operation of the key device 3 can be more stable and have less wobble.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:
1. A key device, comprising:
a substrate comprising a top surface and two pivot seats protruding on the top surface, wherein the pivot seats are spaced from each other, each of the pivot seats has an eave portion laterally extending from a top thereof, and the eave portions each comprise a bottom edge;

a key cap disposed above the top surface, wherein the key cap comprises a side edge and two extending arms extending from the side edge, an end of each of the extending arms has a pivoting portion, and the pivoting portions pivotally abut against the bottom edges of the eave portions respectively without contacting the top surface; and a restoring member disposed between the substrate and the key cap and abutting against a bottom of the key cap;

wherein the key cap further comprises a support member extending from the side edge, the support member is disposed between the two extending arms, the support member comprises at least one convex portion, and the convex portion is against the top surface of the substrate.

2. The key device of claim 1, wherein the convex portion comprises an arc bottom surface, and the arc bottom surface is against the top surface of the substrate.

3. The key device of claim 1, wherein the substrate further comprises a pivot hook protruding on the top surface of the substrate and corresponding to the support member, the support member further comprises an assembling portion pivotally abutting against the pivot hook without contacting the top surface of the substrate.

4. The key device of claim 1, wherein the substrate further comprises a thin film circuit board disposed on the top surface, and the convex portion is against the thin film circuit board.

5. The key device of claim 4, wherein the substrate has an opening, and the opening corresponds to the convex portion.

6. The key device of claim 1, wherein each of the pivoting portions comprises an arc top surface, and the arc top surfaces of the pivoting portions respectively abut against the bottom edges of the eave portions.

7. The key device of claim 1, wherein the key cap further comprises an opposite edge, the opposite edge and the side edge are at two opposite sides of the key cap, and the restoring member is proximal to the opposite edge.

8. The key device of claim 1, wherein the substrate further comprises a first hook member disposed on the top surface, the key cap further comprises a second hook member disposed on the bottom of the key cap, and the first hook member and the second hook member are hooked to each other.

9. The key device of claim 1, wherein each of the pivot seats is one-piece formed with the substrate and is bent upwardly from the substrate.

10. A keyboard device, comprising:
a plurality of key devices, each of the key devices comprising:
a substrate comprising a top surface and two pivot seats protruding on the top surface, wherein the pivot seats are spaced from each other, each of the pivot seats has an eave portion laterally extending from a top thereof, the eave portions each comprises a bottom edge;

a key cap disposed above the top surface, wherein the key cap comprises a side edge and two extending arms extending from the side edge, an end of each of the extending arms has a pivoting portion, and the pivoting portions pivotally abut against the bottom edges of the eave portions respectively without contacting the top surface; and a restoring member disposed between the substrate and the key cap and abutting against a bottom of the key cap;

wherein the key cap further comprises a support member extending from the side edge, the support member is disposed between the two extending arms, the support member comprises at least one convex portion, and the convex portion is against the top surface of the substrate.

11. The keyboard device of claim 10, wherein the convex portion comprises an arc bottom surface, and the arc bottom surface is against the top surface of the substrate.

12. The keyboard device of claim 10, wherein the substrate further comprises a pivot hook protruding on the top surface of the substrate and corresponding to the support member, the support member further comprises an assembling portion pivotally abutting against the pivot hook without contacting the top surface of the substrate.

13. The keyboard device of claim 10, wherein the substrate further comprises a thin film circuit board disposed on the top surface, and the convex portion is against the thin film circuit board.

14. The keyboard device of claim 13, wherein the substrate has an opening, and the opening corresponds to the convex portion.

15. The keyboard device of claim 10, wherein each of the pivoting portions comprises an arc top surface, and the arc top surfaces of the pivoting portions respectively abut against the bottom edges of the eave portions.

16. The keyboard device of claim 10, wherein the key cap further comprises an opposite edge, the opposite edge and the side edge are at two opposite sides of the key cap, and the restoring member is proximal to the opposite edge.

17. The keyboard device of claim 10, wherein the substrate further comprises a first hook member disposed on the top surface, the key cap further comprises a second hook member disposed on the bottom of the key cap, and the first hook member and the second hook member are hooked to each other.

18. The keyboard device of claim 10, wherein each of the pivot seats is one-piece formed with the substrate and is bent upwardly from the substrate.

* * * * *